Patented June 29, 1954

2,682,515

UNITED STATES PATENT OFFICE 2,682,515

ADHESIVE COMPOSITION CONTAINING POLYEPOXIDE MATERIALS

Marguerite Naps, Oakland, Calif., assignor to Shell Development Company, Emeryville, Calif., a corporation of Delaware No Drawing. Application July 5, 1952, Serial No. 297,401

11 Claims. (Cl. 260—18)

This invention relates to a composition of matter containing polyepoxide materials. The composition is particularly useful as an adhesive for metal-to-metal bonding because of the fact that it enables joinder of metals with a hard tough resin bond which has very high strength and the high strength is retained in large measure over a wide range of reduced and elevated temperatures.

Useful resins have been prepared heretofore by curing a glycidyl polyether of a dihydric phenol with the aid of various curing agents such as amines, dicarboxylic acid anhydrides, and certain acids. The resin-forming ingredient employed for this purpose is the glycidyl polyether of a dihydric phenol which is a relatively simple substance in being a linear condensation polymer. The glycidyl polyether is obtainable by reacting at about 50° C. to 150° C. one to two or more mols of epichlorhydrin with a mol of dihydric phenol in the presence of a base such as sodium or potassium hydroxide in amount of about 2% to 30% stoichiometric excess of base to the dihydric phenol. Glycidyl polyethers of low molecular weight are obtainable by mixing a large excess such as about 4 to 10 mols of epichlorhydrin with a mol of dihydric phenol and adding an alkali to the heated mixture while the reaction progresses, the addition of the alkali being regulated so that the reaction mixture is kept at or near the neutral point. The unreacted excess of epichlorhydrin is removed by distillation from the resulting reaction product. The polyethers are also obtainable by substituting glycerol alpha,alpha'-dichlorhydrin for the epichlorhydrin in the noted methods and using about twice the amount of base.

The predominant constituent of the glycidyl polyether of dihydric phenol is represented by the formula

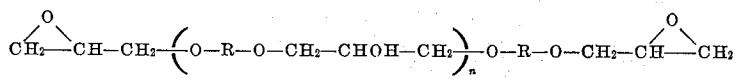

wherein R represents the divalent aromatic hydrocarbon radical (which was linked directly to the two hydroxyl groups of starting dihydric phenol), and $n$ is an integer of the series 0, 1, 2, 3, etc. The glycidyl polyether also contains a small proportion of compounds of similar structure wherein one or both of the glycidyl radicals are replaced by 2,3-dihydroxypropyl radicals (from hydration of glycidyl radicals) and/or 3-chloro-2-hydroxypropyl radicals (from incomplete dehydrochlorination). The glycidyl polyether is thus seen to have a chain of alternating glyceryl and divalent radicals united through ether oxygen with glyceryl radicals in terminal position. The ether oxygen (as distinguished from epoxy oxygen and hydroxyl oxygen) is linked to the primary carbon atoms of the glyceryl radicals. The excess valencies of the glyceryl radicals over those which link epoxide and ether oxygen, link and chemically bind hydroxyl groups and chlorine atoms of the hydrated and hydrochlorinated glycidyl groups in the molecule. The glycidyl polyether is thus free from functional groups other than epoxy groups, hydroxyl groups and chlorine atoms.

The molecular weight of the glycidyl polyether which is reflected in the value of $n$ in the above formula is dependent upon the ratio of epichlorhydrin (or the substitute therefor) to dihydric phenol employed in preparing the polyether. The use of a ratio of about 1.25 mols of epichlorhydrin per mol of dihydric phenol gives glycidyl polyether of intermediate molecular weight and chain length. By increasing the ratio of epichlorhydrin to dihydric phenol, the molecular weight is decreased. If the mol ratio of epichlorhydrin to dihydric phenol is about 10:1, the product is essentially the diglycidyl diether of the dihydric phenol with $n$ equal to or closely approaching zero. Likewise, the use of decreasing ratios of epichlorhydrin to dihydric phenol gives products of higher molecular weight. Although glycidyl polyether of highest molecular weight is obtainable by use of low ratios of epichlorhydrin to dihydric phenol, it is preferred to effect preparation by a different method owing to the fact that removal of the formed salt and excess base from the higher products is so difficult. By reacting less than an equivalent amount of dihydric phenol with a previously prepared glycidyl polyether of dihydric phenol of intermediate molecular weight, there is obtained glycidyl polyether of high molecular weight. The reaction is effected by heating and mixing the dihydric phenol with the intermediate molecular weight glycidyl polyether in a melt and maintaining the temperature at about 150° C. to 200° C. for several hours' time whereby the thermoplastic glycidyl polyether of high molecular weight is obtained.

In using the glycidyl polyether of a dihydric phenol for adhesive purposes, it is desirable and customary to employ a polyether having mobile fluidity at ordinary temperature so as to facilitate spreading or pouring thereof. By choosing a glycidyl polyether of proper type having a low molecular weight, the polyether has suitable mobile fluidity for such purposes. The glycidyl polyether is usually employed in such applications in undiluted condition because incorporation of most inert fluidizing solvents with the polyether gives a cured resin which has greatly reduced physical strength as compared to the cured resin from undiluted polyether. While some success has been obtained in using a normally fluid glycidyl polyether of a dihydric phenol in adhesive applications, the resulting cured resin has certain deficiencies in properties. In particular, the resin bond obtained in joining metal to metal is lacking in adequate shear strength when the temperature is appreciably reduced or elevated, and there are many practical applications which demand retention of high strength at other than customary temperatures. In addition, the resin bond must be resistant to mechanical shock of high intensity, i. e., have high impact strength.

I have now discovered a complex composition of matter which after resinification with a curing agent, gives an adhesive bond that is not only very resistant to mechanical impact, but also retains high shear strength in large measure over a wide range of both reduced or elevated temperature. The composition of the invention is a mixture of three essential components. In brief, the composition comprises a liquid first glycidyl polyether of a dihydric phenol in homogeneous admixture with about an added 3% to 20% by weight of a normally solid second glycidyl polyether of a dihydric phenol and with about an added 5% to 25% by weight of a fluidizing liquid aliphatic polyepoxide, the polyethers having a chain of alternating glyceryl and divalent aromatic radicals united through ether oxygen with glyceryl radicals in terminal position. The first glycidyl polyether which constitutes the bulk of the composition, has a Durrans' Mercury Method melting point below 30° C., has a 1,2-epoxy equivalency between about 1.6 and 2.0, and contains 1 to 1.5 aromatic radicals in the average molecule. The second glycidyl polyether has a Durrans' Mercury Method melting point above 75° C., has a 1,2-epoxy equivalency of about 1.2 to 1.8, and contains at least four of the aromatic radicals in the average molecule. The composition is thus a mixture of (1) a major proportion of glycidyl polyether of a dihydric phenol of short chain length having low melting point so as to be liquid at normal temperature, (2) a small proportion of glycidyl polyether of a dihydric phenol of long chain length having a high melting point so as to be a solid at normal temperature, and (3) a small proportion of an aliphatic liquid polyepoxide which is typified by epoxidized soybean oil or diglycidyl monoether [bis(2,3-epoxypropyl) oxide]. The dihydric phenol from which the two glycidyl polyethers are derived can be the same or different.

In describing the composition, several terms have been referred to which are in need of explanation and definition. By the Durrans' Mercury Method melting point of the polyethers, reference is made to the melting point as determined by the method of T. H. Durrans for thermoplastic materials described in J. Oil and Colour Chem. Assoc., 12, 173–5 (1929). The method gives quite accurate and reproducible results.

The number of aromatic radicals in the average molecule of the glycidyl polyether of a dihydric phenol is equal to $n+1$ wherein $n$ is as described above with respect to the structural formula of the glycidyl polyethers. The value of $n$ is related to the molecular weight of the glycidyl polyethers. The molecular weight is conveniently measured by the customary ebullioscopic method with use of ethylene dichloride as solvent for the glycidyl polyether. The value of $n$ is calculated from the formula $$n = \frac{M - A - 146}{A + 90}$$

wherein M is the measured molecular weight of the glycidyl polyether, and A is the molecular weight of the divalent aromatic radical contained in the polyether, i. e., the calculated molecular weight of the aromatic hydrocarbon radical which was linked directly to the two hydroxyl groups of the dihydric phenol from which the glycidyl polyether was derived.

The 1,2-epoxy equivalency of the glycidyl polyether is the number of epoxy groups

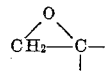

contained in the average molecule of the glycidyl polyether. The 1,2-epoxy equivalency is equal to the measured molecular weight divided by the epoxide equivalent weight. The epoxide equivalent weight is the weight of glycidyl polyether which contains and is equivalent to one 1,2-epoxy group. It is determined by heating a weighed sample of the polyether with an excess of 0.2 N pyridinium chloride in chloroform solution at the boiling point under reflux for two hours whereby the pyridinium chloride quantitatively hydrochlorinates the epoxy groups to chlorhydrin groups. After cooling, the excess pyridinium chloride is back-titrated with 0.1 N sodium hydroxide in methanol to the phenolphthalein end point. The epoxide equivalent weight is calculated by considering that each molecule of consumed HCl from the pyridinium chloride combines with an epoxy group.

The three components of the composition have inter-locking functions and effects on the properties of the cured resin obtainable from the composition. Properties are realized which are not obtainable with any one of the components, nor with any two of them. It is not fully understood why the three-component composition gives the favorable results which are obtained. Although, as explained above, the molecular weight and chain length (value of $n$) of a glycidyl polyether of a dihydric phenol is dependent upon the ratio of epichlorhydrin to dihydric phenol employed in preparation thereof, and although the product from a given preparation is not wholly a single entity with respect to molecular weight and chain length, but is to minor extent a mixture of compounds having somewhat different molecular weights, it was surprising to discover that the cured resin from the composition of the invention has such superior properties to those of cured resin from mixtures containing an aliphatic polyepoxide and only glycidyl polyether of a single preparation. It may, of course, now be realized that the composition contains glycidyl polyether molecules of short chain length in admixture with such polyether molecules of long chain length and that molecules of intermediate chain length are substantially absent. The composition of the invention is thus quite different in constitution from mere mixtures of an aliphatic polyepoxide with glycidyl polyether of a dihydric phenol which has material of predominantly one chain length and only a small amount of polyethers of shorter and longer chain length therein.

The low melting component of the compositions is glycidyl polyether derived from any one of various dihydric phenols. Suitable dihydric phenols include and are exemplified by, but not limited to, such compounds as resorcinol, 1,1-bis(4-hydroxyphenyl)ethane, 1,1-bis(4-hydroxyphenyl)propane, 2,2 - bis(4-hydroxyphenyl)propane, 1,1-bis(4-hydroxyphenyl)butane, 2,2-bis(4-hydroxyphenyl)butane, 1,1 - bis(4-hydroxyphenyl)-2-methylpropane, 3,3-bis(4-hydroxyphenyl)-pentane, and 1,1-bis(4-hydroxyphenyl)-2-ethylhexane. Also suitable are isomeric compounds to those listed above wherein the phenolic hydroxyl groups are in the 2,4' positions and the 2,2' positions. The dihydric phenols are seen to be free from functional groups other than the phenolic hydroxyl groups.

Although the compositions can contain glycidyl polyether of a dihydric phenol which has a Durrans' melting point below 30° C. as major component, by far the most striking obtainment of desirable properties are realized with compositions containing polyether having a melting point below about 15° C. Preferably the low melting constituent is glycidyl polyether of 2,2-bis(4-hydroxyphenyl)propane having a melting point below 15° C., particularly from about 5° C. to 12° C. Another very suitable low melting component is the glycidyl polyether of 1,1-bis(4-hydroxyphenyl)-ethane.

As explained before, the dihydric phenol from which the low melting and high melting glycidyl polyether is derived can be either the same or different. It is generally preferred that both glycidyl polyethers be derived from a single dihydric phenol, and that it be 2,2-bis(4-hydroxyphenyl)propane. However, excellent results are obtainable with compositions containing low melting glycidyl polyether of 1,1-bis(4-hydroxyphenyl)ethane and high melting glycidyl polyether of 2,2-bis(4-hydroxyphenyl)propane.

The high melting component of the compositions is glycidyl polyether of a dihydric phenol that has a Durrans' melting point above 75° C. and contains at least four aromatic radicals from the dihydric phenol. The aromatic radical is the whole divalent hydrocarbon radical of the dihydric phenol, i. e., the radical which was linked directly to the two phenolic hydroxyl groups of the dihydric phenol. For example, the aromatic radical contained in glycidyl polyether of resorcinol is the 3-phenylene radical, that in the polyether of 2,2-bis(4-hydroxyphenyl)propane is the 2,2-bis(4-phenylene)propane radical, and that in the polyether of 1,1-bis(4-hydroxyphenyl)ethane is the 1,1-bis(4-phenylene)ethane radical.

While the long chain constituent of the composition has a Durrans' melting point above 75° C., best results are obtained with glycidyl polyether having a melting point considerably above this minimum. Excellent results are obtainable with polyether having a melting point of at least 125° C. There appears to be no particular upper limit to the melting point for suitability, but generally it is not greater than about 180° C. The glycidyl polyethers having a melting point between 125° C. and 180° C. which contain 6 to 15 of the aromatic radicals in the average molecule thereof are very suitable. Particularly preferred high melting glycidyl polyether for use in the compositions is glycidyl polyether of 2,2-bis(4-hydroxyphenyl)-propane having a melting point of from 140° C. to 160° C. All of the high melting glycidyl polyethers have a 1,2-epoxy equivalency of about 1.2 to 1.8.

The high melting glycidyl polyethers can be derived from any of the particular dihydric phenols described above with respect to the low melting polyethers. If desired, the high melting polyethers can be prepared from other dihydric phenols such as, for example, 4,4'-dihydroxydiphenyl, bis(4-hydroxyphenyl)methane, 2,2-bis(4-hydroxy-2-methylphenyl)propane, 2,2-bis(4-hydroxy-2-tertiarybutylphenyl)propane, bis(2-hydroxynaphthyl)methane, 1,5 - dihydroxynaphthalene, and the like. These dihydric phenols are also free from functional groups other than the two phenolic hydroxyl groups.

Preparation and properties of several typical glycidyl polyethers of dihydric phenols used in compositions of the invention are described below. The parts and percentages are by weight.

*Polyether A*

A solution is prepared by dissolving 2,2-bis(4-hydroxyphenyl)-propane in slightly aqueous epichlorhydrin in the proportion of 5,130 parts (22.5 mols) of the dihydric phenol in 20,812 parts (225 mols) of epichlorhydrin and 104 parts of water. The solution is prepared in a kettle provided with heating and cooling equipment, agitator, distillation condenser and receiver. A total of 1,880 parts of solid 97.5% sodium hydroxide, corresponding to 2.04 mols of sodium hydroxide per mol of bis-phenol (2% excess) is added in installments. The first installment of 300 parts of sodium hydroxide is added and the mixture heated with efficient agitation. The heating is discontinued as the temperature reaches 80° C. and cooling is started in order to remove exothermic heat of reaction. The control is such that the temperature rises only to about 100° C. When the exothermic reaction has ceased and the temperature has fallen to 97° C., a further addition of 316 parts of sodium hydroxide is made and similar further additions are effected at successive intervals. An exothermic reaction takes place after each addition. Sufficient cooling is applied so there is gentle distillation of epichlorhydrin and water, but the temperature is not allowed to go below about 95° C. No cooling is necessary after the final addition of sodium hydroxide. After the last addition of sodium hydroxide with completion of the reaction, the excess epichlorhydrin is removed by vacuum distillation with use of a kettle temperature up to 150° C. and a pressure of 50 mm. Hg. After completion of the distillation, the residue is cooled to about 90° C. and about 360 parts of benzene are added. Cooling drops the temperature of the mixture to about 40° C. with precipitation of salt from the solution. The salt is removed by filtration and the removed salt carefully washed with about an additional 360 parts of benzene to remove polyether therefrom. The two benzene solutions are combined and distilled to separate the benzene. When the kettle temperature reaches 125° C., vacuum is applied and distillation continued to a kettle temperature of 170° C. at 25 mm. pressure. The resulting liquid glycidyl polyether of 2,2-bis(4-hydroxyphenyl)-propane has the following properties.

Durrans' melting point, °C _____ 9
Molecular weight _____ 370
Epoxide value (epoxide equivalents per 100 grams) _____ 0.50
Epoxide equivalent weight _____ 200
Hydroxyl value (hydroxyl equivalents per 100 grams) _____ 0.08
Per cent chlorine _____ 0.46

From the above values, n is 0.106 so the average molecule of the polyether contains 1.106 of the aromatic radicals therein. The 1,2-epoxy equivalency of the product is 1.85.

Preparation in like manner gives glycidyl polyether of resorcinol which is a viscous liquid having Durrans' melting point of −9° C., an epoxide equivalent weight of 136.5 and a chlorine content of 0.4%. Similar preparation gives glycidyl polyether of 1,1-bis(4-hydroxyphenyl)-ethane having a Durrans' melting point of 2° C., a molecular weight of 342, and an epoxide value of 0.54 epoxide equivalents per 100 grams so $n=0.06$ and the 1,2-epoxy equivalency is 1.85. Another polyether likewise obtainable is glycidyl polyether of 1,1-bis(4-hydroxyphenyl)-2-ethylhexane having a Durrans' melting point of 14° C., a molecular weight of 441 and an epoxide value of 0.39 epoxide equivalents per 100 grams so $n=0.18$ and the 1,2-epoxy equivalency is 1.72.

Preparation and properties of high melting glycidyl polyethers will next be exemplified.

Polyether B

In a vessel fitted with an agitator, 228 parts of 2,2-bis(4-hydroxyphenyl)propane and 55 parts of sodium hydroxide as a 10% aqueous solution are introduced and heated to about 45° C. whereupon 113 parts of epichlorhydrin are added rapidly while agitating the mixture. The temperature of the mixture is then gradually increased and maintained at about 95° C. for 80 minutes. The mixture separates into a two-phase system and the aqueous layer is drawn off from the taffy-like product which forms. The latter is washed with hot water while molten until the wash water is neutral to litmus. The product is then drained and dried by heating to a final temperature of 130° C. The resulting solid glycidyl polyether has the following properties.

| | |
|---|---|
| Durrans' melting point, ° C | 98 |
| Molecular weight | 1400 |
| Epoxide value (equivalents epoxide per 100 grams) | 0.12 |
| Epoxide equivalent weight | 834 |
| Hydroxyl value (equivalents hydroxyl per 100 grams) | 0.348 |
| Per cent chlorine | 0.14 |

The value of n is 3.74 and the 1,2-epoxy equivalency is 1.68.

Polyether C

To 100 parts of Polyether A there are added 45 parts of 2,2-bis(4-hydroxyphenyl)propane and the mixture is heated at 200° C. for 90 minutes with occasional stirring. The proportion of dihydric phenol is such that about 0.78 equivalent of phenolic hydroxyl group is initially present per equivalent of epoxide in the glycidyl polyether. The resulting solid product has the following properties.

| | |
|---|---|
| Durrans' melting point, ° C | 86 |
| Molecular weight | 1230 |
| Epoxide value (equivalents epoxide per 100 grams) | 0.117 |
| Epoxide equivalent weight | 855 |
| Hydroxyl value (equivalents hydroxyl per 100 grams) | 0.354 |
| Per cent chlorine | 0.32 |

This high melting thermoplastic glycidyl polyether of 2,2-bis(4-hydroxyphenyl)propane has $n=3.1$ and a 1,2-epoxy equivalency of 1.44.

Polyether D

To 100 parts of Polyether B heated to about 150° C., there are added 5 parts of 2,2-bis(4-hydroxyphenyl)propane. The heating is continued for about 2 hours while stirring and gradually increasing the temperature to 200° C. The resulting solid product has the following properties.

| | |
|---|---|
| Durrans' melting point, ° C | 122 |
| Molecular weight | 2900 |
| Epoxide value (equivalents epoxide per 100 grams) | 0.06 |
| Epoxide equivalent weight | 1670 |
| Hydroxyl value (equivalents hydroxyl per 100 grams) | 0.37 |
| Per cent chlorine | 0.13 |

The value of n is 9.0 and the 1,2-epoxy equivalency is 1.7.

Polyether E

By using 7.75 parts of 2,2-bis(4-hydroxyphenyl)propane with 100 parts of Polyether B and effecting the reaction under the same conditions as described above for Polyether D, there is obtained glycidyl polyether having the following properties.

| | |
|---|---|
| Durrans' melting point, ° C | 148 |
| Molecular weight | 3750 |
| Epoxide value (equivalents epoxide per 100 grams) | 0.036 |
| Epoxide equivalent weight | 2780 |
| Hydroxyl value (equivalents hydroxyl per 100 grams) | 0.40 |
| Per cent chlorine | 0.13 |

This solid product has $n=12.0$ and an epoxide equivalency of 1.35.

The aliphatic polyepoxides employed as the third component in the composition of the invention is a liquid of mobile fluidity having a viscosity of less than about 500 centipoises at 25° C. In being a polyepoxide, the substance contains two or more epoxide groups in the molecule. These can be 1,2-epoxide groups in terminal position, or be epoxide groups with internal location. In all cases, the two bonds of the epoxide oxygen atom are linked to different saturated carbon atoms which are adjacent and linked directly together. The polyepoxide is of aliphatic character and thus free of cyclic aromatic hydrocarbon groups as well as being free from reactive functional groups other than epoxy and hydroxyl groups.

A variety of particular polyepoxide compounds and substances are suitable for use in composition. The simplest diepoxide contains at least four carbon atoms as is the case with butadiene dioxide or 1,2-epoxy-3,4-epoxybutane. The epoxy groups may be separated from each other by ether, oxygen or sulfur as in bis(2,3-epoxypropyl) ether, bis(2,3-epoxybutyl) ether, bis(2,3-epoxypropyl)thioether, 1,2-bis(2,3-epoxypropyloxy)ethane, etc. Also suitable are complex polyepoxides of mobile fluidity from reaction of at least two mols of epichlorhydrin with a mol of polyhydric alcohol such as glycerol, erythritol, diethylene glycol, pentaerythritol, polyallyl alcohol, or the like, in the presence of a catalyst such as $BF_3$-ether complex followed by dehydrochlorination of the resulting chlorhydrin polyether with a base such as sodium silicate. Epoxidized triglycerides constitute a preferred class of aliphatic polyepoxides. These are prepared by epoxidizing the olefinic unsaturation contained in the acyl groups of natural oils with per fatty acids such as peracetic or performic acid. For example, see the methods described in U. S. Patent No. 2,485,160. Polyepoxides of this type include epoxidized soybean, cottonseed, peanut, olive, corn, tobacco seed, perilla, castor, linseed, sunflower and safflower oil. These epoxidized vegetable oils are liquids of mobile fluidity that contain about 2.5 to 5 epoxy groups per molecule. I have found that epoxidized soybean oil is a particularly suitable member of the preferred class.

The presence of the aliphatic polyepoxide in the composition adds greatly to its utility. Furthermore, the function of the polyepoxide in the composition is unexpected. The mixture of low melting glycidyl polyether of a dihydric phenol containing the small proportion of added high melting glycidyl polyether is usually a liquid of such high viscosity that it cannot be conveniently spread at normal temperature in applications as an adhesive. By incorporating the liquid polyepoxide therewith, a spreadably fluid composition is obtained. Furthermore, the cured composition retains its high strength properties in spite of the inclusion therein of the liquid aliphatic polyepoxide. While the two component system of low and high melting glycidyl polyether can be fluidized with a limited class of compounds, of which ethylene glycol and glycerol are typical, the cured resin therefrom has low strength and this is particularly true at reduced and elevated temperatures. Most liquids of fluidizing character are not compatible in the cured composition. For example, incorporation of a vegetable oil as such into the mixture of glycidyl polyethers followed by cure of the composition gives a non-homogeneous product with poor physical strength. The presence of the liquid polyepoxide in the composition is thus seen to give advantageous and unique results.

The high shear strengths obtained at elevated temperature in adhesive applications is now believed due to the presence of the added high melting glycidyl polyether. By having it present, the composition can be utilized in many applications for which prior compositions were unsuitable because they did not retain high strength at elevated temperatures.

The proportion of liquid aliphatic polyepoxide contained in the composition is such that the composition has a spreadable viscosity of about 30 to 800 poises at 25° C. as is realized with incorporation of about an added 5% to 25% by weight of the liquid epoxide based upon the low melting glycidyl polyether in the composition. Preferably the proportion is such that the composition has a viscosity of about 250 to 500 poises at 25° C.

An excellent composition contains (1) a first glycidyl polyether of 2,2-bis(4-hydroxyphenyl)-propane in admixture with (2) about an added 5% to 10% by weight of a second glycidyl polyether of 2,2-bis(4-hydroxyphenyl)propane, and (3) about an added 8% to 20% by weight of epoxidized soybean oil containing about 2.5 to 5 epoxy groups per molecule. The two polyethers in this composition have a chain of alternating glyceryl and 2,2-bis(4-phenylene)propane radicals united by ether oxygen with glyceryl radicals in terminal position. The first glycidyl polyether has a Durrans' Mercury Method melting point below 15° C., has a 1,2-epoxy equivalency between 1.6 and 2.0, and contains 1 to 1.5 of the aromatic radicals in the average molecule thereof, while the second glycidyl polyether has a Durrans' Mercury Method melting point of from about 125° C. to about 180° C., has a 1,2-epoxy equivalency between 1.2 and 1.8, and contains 6 to 15 of the aromatic radicals in the average molecule thereof. Finely divided asbestos fiber in amount of about an added 20% to 50% based upon the weight of the first glycidyl polyether may be included in this composition.

The composition of the invention is prepared by bringing the three components together into a homogeneous mixture. It is convenient to add the high melting glycidyl polyether in finely divided or powdered condition to the low melting polyether which is heated to about 60° C. to 120° C., and to stir the mixture at the elevated temperature until the high melting polyether dissolves. The fluidizing polyepoxide is then stirred in to complete the preparation.

In using the composition for adhesive purposes in metal-to-metal bonding, it has been found useful to also include an inert solid comminuted filler in the composition in amount of about an added 5% to 400% by weight based upon the low melting glycidyl polyether in the composition. Inorganic fillers such as iron oxide or asbestos, not only contribute to the shear strength of the cured resin bond, but also improve the retention of high strength at elevated temperatures.

In using the compositions of the invention, a hardening agent is incorporated therewith. Upon the addition of the hardening agent, the composition begins to cure and harden even at ordinary temperature. A great variety of substances are now known to be hardening agents for the resin-forming ingredients of the composition such as alkalies like sodium or potassium hydroxide; alkali phenoxides like sodium phenoxides; carboxylic acids or anhydrides such as formic acid, oxalic acid or phthalic anhydride; Friedel-Crafts metal halides like aluminum chloride, zinc chloride, ferric chloride, or boron trifluoride, as well as complexes thereof with ethers, acid anhydrides, ketones, diazonium salts, etc.; phosphoric acid and partial esters thereof including n-butyl orthophosphate, diethyl orthophosphate and hexaethyl tetraphosphate; and amino compounds such as triethyl amine, ethylene diamine, diethyl amine, diethylene triamine, triethylene tetramine, pyridine, piperidine, N,N-diethyl-1,3-propanediamine, dicyandiamide, melamine, fatty acid salts of amines, and the like. The hardening agent is added and mixed in with the composition in order to effect hardening. The amounts vary considerably depending upon the particular agent employed. For the alkalies or phenoxides, 2 to 4 per cent is suitable. With phosphoric acid and esters thereof, good results are obtained with 1 to 10 per cent added. The amino compounds are used in amounts of about 5 to 15 per cent and the others involve addition of about 1 to 20 per cent.

In applying the composition for adhesive purposes, the composition which may also contain various optional constituents has added thereto sufficient hardening agent and the mixture is applied as by spreading upon a surface desired to be united to another surface at a thickness of about 0.0005 to 0.1 inch thickness. The adhesive mixture is suitable for uniting various surfaces such as wood to wood, wood to metal, metal to metal, resin to resin, or any combination thereof. After application and joinder of the surfaces desired to be united, the adhered articles are allowed to cure for a period of from about 30 minutes to a day or more, depending upon the hardening agent and temperature employed. In this time when heating is omitted, the adhesive composition will set up to a solid which will permit ordinary handling thereof. Maximum strength for the adhesive layer will be reached within one day to two weeks. While the application may be effected at ordinary atmospheric temperature and the curing may also be permitted to occur at such temperatures, the curing may be effected in shorter times at elevated temperatures such as up to 75° C., 100° C., 150° C., or even higher in some cases. In cases where elevated curing temperature is employed, the chosen temperature is below the boiling temperature of the lowest boiling constituent contained in the mixture, and preferably, it is at least 20° C. below such boiling temperature.

Certain compositions of the invention and their performance will be illustrated in the following examples which are not to be construed as limiting the invention to details described therein. The parts are by weight. In testing the compositions, the freshly prepared adhesive mixture of the composition and the curing agent was applied to clean aluminum sheets with a 5 mil doctor blade, the coated surfaces were joined, and after baking to effect cure, the tensile shear strength and the bend strength were determined as described in U. S. A. F. Specification 14164. The impact strength was determined according to ASTM method D-950-47T with clean aluminum blocks prepared in like manner.

*Example 1*

Base compositions were prepared containing 100 parts of Polyether A, 10 parts of Polyether E and 12 parts of epoxidized soybean oil. The epoxidized soybean oil contained about 3.6 epoxy groups per molecule and was the same as the epoxidized oil to be referred to in subsequent examples. Fine asbestos fiber (Johns-Manville 7TF-2) in amounts listed in the following table along with 10 parts of N,N-diethyl-1,3-propanediamine were added to and mixed with the base compositions. The freshly prepared adhesive mixture was tested for joining aluminum, cure being effected by baking for 45 minutes at 200° F. in an oven. In all cases, the impact strength at both —70° F. and 180° F. was found to be more than 15 ft. lbs. per sq. in. The tensile shear strength in pounds per square inch (p. s. i.) and the bend test results are tabulated below.

| Parts of Asbestos | Tensile Shear Strength, p. s. i. | | Bend Test lbs. at 77° F. |
|---|---|---|---|
| | at 77° F. | at 180° F. | |
| 0 | 2,585 | 1,960 | 144 |
| 20 | 3,115 | 2,880 | 200 |
| 30 | 3,600 | 3,560 | 180 |
| 40 | 3,220 | 3,090 | 176 |
| 50 | 3,390 | 2,810 | 184 |

It will be observed from the foregoing results that the composition of the invention in cured condition gives very high shear strengths not only at room temperature (77° F.), but also at the elevated temperature of test, 180° F.

*Example 2*

The effect of various amounts of epoxidized soybean oil in the composition will be illustrated in this example. Each mixture contained 100 parts of Polyether A, 10 parts of Polyether E, 30 parts of the fine asbestos fiber and 8 parts of N,N-diethyl-1,3-propanediamine as well as the amounts of the epoxidized soybean oil listed in the table below. The mixtures were applied as adhesive to aluminum and cured by baking for 45 minutes at 200° F.

| Parts of Epoxidized Soybean Oil | Tensile Shear Strength, p. s. i. | |
|---|---|---|
| | at 77° F. | at —70° F. |
| 8 | 2,790 | 2,300 |
| 10 | 3,500 | 2,565 |
| 12 | 3,250 | 2,725 |
| 16 | 3,285 | 2,515 |
| 20 | 3,245 | 2,370 |

It will be noted from the foregoing results that very high shear strengths at the low temperature of —70° F. are obtained.

*Example 3*

The use of other liquid aliphatic polyepoxides in the composition will be illustrated in this example. Base mixtures were prepared containing 100 parts of Polyether A, 10 parts of Polyether E, and 30 parts of the fine asbestos fiber. The adhesive mixtures also contained the liquid aliphatic polyepoxides given in the table below in the amounts indicated and the listed amounts of N,N - diethyl - 1,3 - propanediamine as curing agent. The mixtures were applied as adhesives to aluminum and cured by baking for 45 minutes at 200° F. The results follow.

| Liquid Polyepoxide | Parts Curing Agent | Tensile Shear Strength, p. s. i., at— | | | |
|---|---|---|---|---|---|
| | | —70° F. | 77° F. | 180° F. | 77° after 1 hour in boiling H₂O |
| 12 parts Epoxidized Soybean Oil | 8 | 2,620 | 3,390 | 3,445 | 3,400 |
| 4 parts Diglycidyl Monoether | 8 | 2,185 | 2,510 | | |
| 8 parts Diglycidyl Monoether | 8 | 2,025 | 3,100 | | 2,760 |
| 12 parts Diglycidyl Monoether | 8 | 2,000 | 2,890 | 2,850 | 2,560 |
| 16 parts Diglycidyl Monoether | 8 | 1,980 | 2,670 | | 2,540 |
| 8 parts Polyallyl Glycidyl Polyether | 10 | 2,730 | 3,130 | 2,825 | |
| 12 parts Polyallyl Glycidyl Polyether | 12 | 2,735 | 2,970 | 2,810 | |
| 16 parts Polyallyl Glycidyl Polyether | 16 | 3,090 | 3,500 | 3,265 | |

*Example 4*

The preferred composition of the invention contains 100 parts of Polyether A, 10 parts of Polyether E, 12 parts of the epoxidized soybean oil, and 30 parts of the fine asbestos fiber. Various curing agents were employed in adhesive use of the composition for joining aluminum, the cure being effected by baking for 45 minutes at 200° F. The results are given in the following table which indicates the amount of curing agent used in the composition. For brevity, the curing agents identified as "Triacetate," "Triisobutyrate," etc., were amine salts prepared by neutralizing one mol of 2,4,6-tri(dimethylaminomethyl)phenol with three mols of the appropriate fatty acid to form the indicated salt.

| Curing Agent, Parts and Name | Tensile Shear Strength, p. s. i. | | | Bend Test, lbs. at 77° F. |
|---|---|---|---|---|
| | —70° F. | 77° F. | 180° F. | |
| 5 Dimethylethanolamine | 2,830 | 3,505 | 3,600 | 189 |
| 8 Dimethylethanolamine Acetate | 2,820 | 3,630 | 3,405 | 197 |
| 10 Triacetate | 2,430 | 3,320 | 3,180 | 166 |
| 12 Triisobutyrate | 2,485 | 3,535 | 2,785 | |
| 16 Tricaproate | 2,235 | 3,210 | 1,810 | 174 |
| 17.5 Trilaurate | 2,490 | 3,355 | 1,605 | 158 |
| 19.3 Trimyristate | 2,535 | 3,500 | 1,655 | 177 |

Example 5

The use of various finely divided fillers in a preferred composition of the invention will be illustrated. In each case, the base composition consisted of 100 parts of Polyether A, 10 parts of Polyether E and 12 parts of the epoxidized soybean oil as well as the amount and kind of filler listed in the table below and 10 parts of N,N-diethyl-1,3-propanediamine as curing agent. Before adding the curing agent, all the compositions except the first had approximately the same viscosity. The mixtures were tested as adhesives for aluminum, cure being effected by baking for 3 hours at 200° F. The results follow.

| Filler | Parts Filler | Tensile Shear Strength, p. s. i. | |
|---|---|---|---|
| | | at 77° F. | at 180° F. |
| None | 0 | 2,715 | 1,355 |
| Asbestos | 30 | 3,330 | 2,795 |
| Zinc oxide | 122 | 2,395 | 2,660 |
| Titanium oxide | 163 | 2,465 | 3,080 |
| Calcium oxide | 106 | 2,835 | 2,680 |
| Nickelic oxide | 244 | 2,370 | 3,050 |
| Lead oxide | 264 | 2,475 | 3,415 |
| Manganese oxide | 346 | 2,610 | 2,805 |
| Cupric oxide | 382 | 2,535 | 1,920 |
| Stannic oxide | 130 | 2,507 | 2,815 |
| Ferric oxide | 122 | 2,795 | 3,480 |
| Alumina | 85 | 2,835 | 3,250 |
| Glass floc | 38 | 3,185 | 1,840 |
| Hydrated silicon dioxide | 20 | 3,485 | 3,075 |
| Cellulose floc | 8 | 2,515 | 1,820 |
| Silica | 8 | 2,245 | 1,825 |
| Nylon floc | 25 | 3,285 | 2,005 |
| Rice hull floc | 61 | 2,885 | 2,015 |

Example 6

The use of various times and temperatures of cure will be illustrated. There was employed the preferred composition containing 100 parts of Polyether A, 10 parts of Polyether E, 12 parts of the epoxidized soybean oil, and 30 parts of fine asbestos fiber to which was added 8 parts of N,N-diethyl-1,3-propanediamine. The mixtures were again employed as adhesives to bond aluminum together using the times and temperatures of cure indicated in the following table.

| Cure Conditions | Tensile Shear Strength, p. s. i. | | |
|---|---|---|---|
| | at −70° F. | at 77° F. | at 180° F. |
| 2 hrs. at 165° F | 2,115 | 3,215 | 3,640 |
| 45 min. at 200° F | 2,620 | 3,390 | 3,445 |
| 45 min. at 240° F | 3,180 | 3,270 | 2,860 |

Example 7

For purposes of comparison, the performance of a composition of the invention will be contrasted with the performance of a similar composition which contained furfural, a fluidizing diluent recommended by prior workers in the art, in place of a liquid aliphatic polyepoxide. The composition of the invention contained 100 parts of Polyether A, 10 parts of Polyether E, 12 parts of the epoxidized soybean oil and 30 parts of the fine asbestos fiber to which were added 10 parts of N,N-diethyl-1,3-propanediamine as curing agent to form an adhesive mixture. The other adhesive mixture contained the same kind and amounts of constituents except that 12 parts of furfural were substituted for the 12 parts of epoxidized soybean oil. The two mixtures were tested as adhesives to join aluminum, cure being effected by baking for 45 minutes at 200° F. The results follow.

| Fluidizing Component | Tensile Shear Strength, p. s. i. | | |
|---|---|---|---|
| | at −70° F. | at 77° F. | at 180° F. |
| Furfural | 2,555 | 2,725 | 1,525 |
| Epoxidized Soybean Oil | 2,800 | 3,570 | 3,630 |

It will be observed that the shear strengths obtained with the composition of the invention are much superior to those obtained with the corresponding composition containing furfural. This is especially true for the strengths at the elevated temperature of 180° F. where composition of the invention gives a strength almost 250% greater than that from the furfural-containing composition.

The glycidyl polyethers of dihydric phenols referred to herein are condensates of dihydric phenols with epichlorhydrin and are known as "Ethoxyline" resins. See Chemical Week, vol. 69, page 27, for September 8, 1951.

I claim as my invention:

1. A composition of matter comprising (1) a first glycidyl polyether of a dihydric phenol in admixture with about an added 3% to 20% by weight of (2) a second glycidyl polyether of a dihydric phenol and (3) a liquid aliphatic polyepoxide having a viscosity of less than about 500 centipoises at 25° C., said polyethers having a chain of alternating glyceryl and divalent aromatic radicals united by ether oxygen with glyceryl radicals interminal position, and said first glycidyl polyether having a Durrans' Mercury Method melting point below 30° C., having a 1,2-epoxy equivalency between 1.6 and 2.0, and containing 1 to 1.5 of the aromatic radicals in the average molecule thereof, and said second glycidyl polyether having a Durrans' Mercury Method melting point above 75° C., having a 1,2-epoxy equivalency of 1.2 to 1.8, and containing at least four of the aromatic radicals in the average molecule thereof.

2. A composition as defined in claim 1 wherein the liquid aliphatic polyepoxide is an epoxidized triglyceride containing about 2.5 to 5 epoxy groups per molecule.

3. A composition as defined in claim 1 which also contains a finely divided inert solid filler in amount of about an added 5% to 400% based upon the weight of the first glycidyl polyether.

4. A composition as defined in claim 3 wherein the liquid aliphatic polyepoxide is an epoxidized triglyceride containing about 2.5 to 5 epoxy groups per molecule.

5. A composition as defined in claim 3 wherein the liquid aliphatic polyepoxide is epoxidized soybean oil containing about 2.5 to 5 epoxy groups per molecule.

6. A composition as defined in claim 3 wherein the liquid aliphatic polyepoxide is diglycidyl monoether.

7. A composition as defined in claim 3 wherein the liquid aliphatic polyepoxide is polyallyl glycidyl ether.

8. A composition as defined in claim 3 wherein the dihydric phenol of both glycidyl polyethers is 2,2-bis(4-hydroxyphenyl)propane.

9. A composition as defined in claim 3 wherein the dihydric phenol of both glycidyl polyethers is 2,2-bis(4-hydroxyphenyl)propane, and the Durrans' Mercury Method melting point of the first glycidyl polyether is below 15° C. and that of the second is between about 125° C. and 180° C.

10. A composition of matter comprising (1) a first glycidyl polyether of 2,2-bis(4-hydroxyphenyl)propane in admixture with (2) about an added 5% to 10% by weight of a second glycidyl polyether of 2,2-bis(4-hydroxyphenyl)propane, and (3) about an added 8% to 20% by weight of epoxidized soybean oil containing about 2.5 to 5 epoxy groups per molecule, said two polyethers having a chain of alternating glyceryl and 2,2-bis(4-phenylene)propane radicals united by ether oxygen with glyceryl radicals in terminal position, and said first glycidyl polyether having a Durrans' Mercury Method melting point below 15° C., having a 1,2-epoxy equivalency between 1.6 and 2.0, and containing 1 to 1.5 of the aromatic radicals in the average molecule thereof, and said second glycidyl polyether having a Durrans' Mercury Method melting point of from about 125° C. to about 180° C., having a 1,2-epoxy equivalency between 1.2 and 1.8, and containing 6 to 15 of the aromatic radicals in the average molecule thereof.

11. A composition as defined in claim 10 which also contains finely divided asbestos fiber in amount of about an added 20% to 50% based upon the weight of the first glycidyl polyether.

References Cited in the file of this patent

UNITED STATES PATENTS

| Number | Name | Date |
|---|---|---|
| 2,575,558 | Newey et al. | Nov. 20, 1951 |
| 2,602,785 | Wiles et al. | July 8, 1952 |